United States Patent
Febbraro et al.

(10) Patent No.: US 10,234,575 B2
(45) Date of Patent: Mar. 19, 2019

(54) APPARATUS FOR USE IN A DIRECTIONAL-NEUTRON DETECTOR, DIRECTIONAL-NEUTRON DETECTORS AND METHODS OF USE THEREOF

(71) Applicant: UT-Battelle, LLC, Oak Ridge, TN (US)

(72) Inventors: Michael T. Febbraro, Knoxville, TN (US); Kelly A. Chipps, Oak Ridge, TN (US); Steven D. Pain, Oak Ridge, TN (US); William A. Peters, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 15/659,145

(22) Filed: Jul. 25, 2017

(65) Prior Publication Data
US 2018/0024255 A1    Jan. 25, 2018

Related U.S. Application Data
(60) Provisional application No. 62/366,175, filed on Jul. 25, 2016.

(51) Int. Cl.
*G01T 3/06*    (2006.01)
*G01T 1/29*    (2006.01)

(52) U.S. Cl.
CPC ............. *G01T 3/06* (2013.01); *G01T 1/2907* (2013.01)

(58) Field of Classification Search
CPC ....................................................... G01T 3/06
See application file for complete search history.

(56) References Cited

U.S. PATENT DOCUMENTS

| | | | |
|---|---|---|---|
| 2,879,402 A | 7/1953 | Ferre | |
| 5,880,469 A | 3/1999 | Miller | |
| 7,863,579 B2 | 1/2011 | Suhami | |
| 2007/0057194 A1* | 3/2007 | Ryan | G01T 1/20 250/390.11 |
| 2009/0014662 A1* | 1/2009 | Suhami | G01T 3/06 250/390.11 |

(Continued)

OTHER PUBLICATIONS

Fisher, P. et al., "Directional Neutron Detection", http://www2.lns.mit.edu/fisherp/WhitePaper_V2.pdf, Apr. 24, 2011, pp. 1-20.

(Continued)

*Primary Examiner* — Mark R Gaworecki
(74) *Attorney, Agent, or Firm* — Scully, Scott, Murphy & Presser, P.C.

(57) ABSTRACT

An apparatus for used in a directional-neutron detector is disclosed. The apparatus comprises a structure having a plurality of parallel active channels separated by inactive regions. The plurality of active channels is filled with scintillating material. The scintillating material is configured to emit light in response to neutron scattering. The scintillating material may be neutron-gamma discriminating. The scintillating material may be sealed in the plurality of active channels. The seal is disposed on respective ends of the plurality of active channels. Directional-neutron detectors are also disclosed having the structure.

22 Claims, 11 Drawing Sheets

(56) References Cited

U.S. PATENT DOCUMENTS

2009/0294686 A1* 12/2009 Chandrasekharan ... G01T 1/185 250/391

OTHER PUBLICATIONS

Mascarenhas, N. et al., "Directional Neutron Detectors for Use with 14 MeV Neutrons", Sandia National Laboratories report, SAND2005-6255, Oct. 2005, pp. 1-32.

Vanier, P. et al., "Design of large-Area Fast Neutron Directional Detector", Brookhaven National Laboratory report, BNL-77298-2006-CP, Nov. 2006, pp. 1-7.

Iguchi, T. et al., "Development of Directional Neutron Detector for Compact Fast Neutron Camera", Nuclear Science Symposium Conference Record, IEEE, Oct. 2000, pp. 6/207-6/210, vol. 1.

Peurrung, A.J., "Location of Neutron Sources Using Moderator-Free Directional Thermal Neutron Detectors", IEEE Transactions on Nuclear Science, Jun. 1997, pp. 543-550, vol. 44, issue 3.

Schulte, R.L. et al., "Development of a portable directional thermal neutron detection system for nuclear monitoring", Nuclear Instruments and Methods in Physics Research A, Feb. 1999, pp. 852-857, vol. 422, issues 1-3.

Roccaro, A. et al., "A background-free direction-sensitive neutron detector", Nuclear Instruments and Methods in Physics Research A, Sep. 11, 2009, pp. 305-309, vol. 608, issue 2.

Brooks, F.D., "Development of organic scintillators", Nuclear Instruments and Methods, Jun. 1979, pp. 477-505, vol. 162, issue 1-3.

Artamonov, A. et al., "Investigations on capillaries filled with liquid scintillator for high resolution particle tracking", Nuclear Instruments and Methods in Physics Research Section A, Jan. 1, 1991, pp. 53-62, vol. 300, issue 1.

Peel, J. et al., "Development of a directional scintillating fiber detector for 14 MeV neutrons", Nuclear Instruments and Methods in Physics Research A, Jan. 1, 2006, pp. 287-290, vol. 556, issue 1.

Weiss, C. et al., "Ionization signals from diamond detectors in fast-neutron fields", The European Physical Journal A, Sep. 2016, pp. 287-290.

Weltz, A., "Development of a modular directional and spectral neutron detection system using solid-state detectors", Nuclear Instruments and Methods in Physics Research A, 2015, pp. 28-37, vol. 792, issue 10.

* cited by examiner

APPARATUS FOR USE IN A DIRECTIONAL-NEUTRON DETECTOR, DIRECTIONAL-NEUTRON DETECTORS AND METHODS OF USE THEREOF

CROSS-REFERENCE TO RELATED APPLICATIONS

This application claims the benefit of and priority to U.S. Provisional Application Ser. No. 62/366,175 filed Jul. 25, 2016, the contents of which is incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

This disclosure relates to an apparatus for use in a directional-neutron detector. This disclosure also relates to directional-neutron detectors and methods of use.

BACKGROUND

Special Nuclear Materials (SNM) and radioactive sources, many of which emit neutrons, are a concern for a wide variety of organizations and programs, from Homeland Security to health physics to nuclear power. The ability to detect such materials in the field, through the use of neutron detectors, is thus a practical and pressing need.

Neutron dosimeter "balls" are readily available commercially, but these can only provide integrated dose rates, and are not helpful in locating the source of the neutron flux. The ability to determine the direction of a neutron source, using a simple device based on robust and inexpensive technology, would therefore be useful to a wide range of disciplines.

Previous attempts at directional neutron detectors have been unable to address issues inherent with providing directional neutron detection in the field. For example, detectors have been developed for well-logging in the oil and gas industry. These are based on detection of neutron and boron reaction products via ionized gas, and the directionality is provided solely by directional shielding. While the system is robust, given its use in oil wells, it is also only sensitive to thermal or epithermal neutrons.

Another directional neutron detector is based on gas detection of boron+n reaction products, this time in a large gas volume, where directionality is determined by reconstruction of the tracks the reaction products make through the gas, which is a position sensitive ionization chamber. This is severely rate limited.

Other detectors are based on a large array of scintillating fibers coupled to photosensitive detectors. Directionality of neutrons is estimated from the sequence of fibers traversed by the scattered protons and energy deposited in each one of them. In another case, the scintillation fibers are variously low wavelength emitters or higher-wavelength emitters; neutrons coming in the preferred direction create an "anti-correlation" in two photo multiplier tubes (PMTs) at the two wavelengths, while neutrons from perpendicular direction hit multiple fibers and cause "correlation" in the two PMTs. Gamma events are also discriminated by vetoing correlated PMT signals, as the fibers are not inherently neutron-gamma discriminating.

Other designs are also based on scintillating fibers, but use sophisticated computer algorithms that look at differences in the signals from different angles, and are only sensitive to high energy neutrons.

Other detectors use 3He tubes, which is too rare and expensive for widespread use. Other detectors use large area silicon detectors, so they are also too expensive for widespread deployment in the field. Other examples use a large gas ionization chamber that is filled with 4He for high energy neutrons and 3He for thermal neutrons, with a camera to record the tracks of recoils and determine directionality. This is severely rate limited, requires a large volume of gas, and requires the use of 3He.

Other detectors are based on direct detection of the recoiling proton from neutron+hydrogen reactions in thin hydrogenous material (where the hydrogenous material is not a scintillating material). The recoiling proton is sent through a collimation mechanism to be detected in a charged particle detector at the end, such that directionality is achieved as protons from perpendicularly incident neutrons do not make it through the collimator. The use of charged particle detection is difficult in the field as it requires vacuum.

SUMMARY

Disclosed is an apparatus for use in a directional-neutron detector. The apparatus comprises a structure having a plurality of parallel active channels separated by inactive regions. The plurality of active channels is filled with a scintillating material. The scintillating material is configured to emit light in response to neutron scattering. The scintillating material may be sealed in the plurality of active channels. The seal is disposed on respective ends of the plurality of active channels.

In an aspect of the disclosure, the scintillating material is a hydrogenous scintillating material capable of neutron-gamma discrimination.

In an aspect of the disclosure, the structure is a glass capillary plate. The glass capillary plate comprises two or more hollow tubes. The scintillating material is disposed within the two or more hollow tubes.

In an aspect of the disclosure, the inactive regions are configured and dimensioned to inhibit recoiling hydrogen isotopes from travelling from one active channel to another.

Also disclosed is a directional-neutron detector. The detector comprises an opaque housing, the structure in accordance with aspects of the disclosure, at least one light collection device coupled to the structure and in optical communication with the structure and a processor. The collection face of the at least one light collection device is disposed perpendicular to the axial direction of the plurality of parallel active channels. The at least one light collection device is configured to convert the emitted light from the scintillating material into a signal.

In an aspect of the disclosure, both the light collection device and the structure are contained in the opaque housing.

In an aspect of the disclosure, the processor is coupled to the light collection device and a power supply. The processor is configured to process the signal to determine whether the signal resulted from emitted light in response to neutron scattering.

In another aspect of the disclosure, the processor is configured to issue a notification based on the determination.

In an aspect of the disclosure, the detector is handheld.

In other aspects of the disclosure, the detector is mounted to or in a system at an airport, port, dock, toll booth or reactor.

DETAILED DESCRIPTION

Figure 1A:
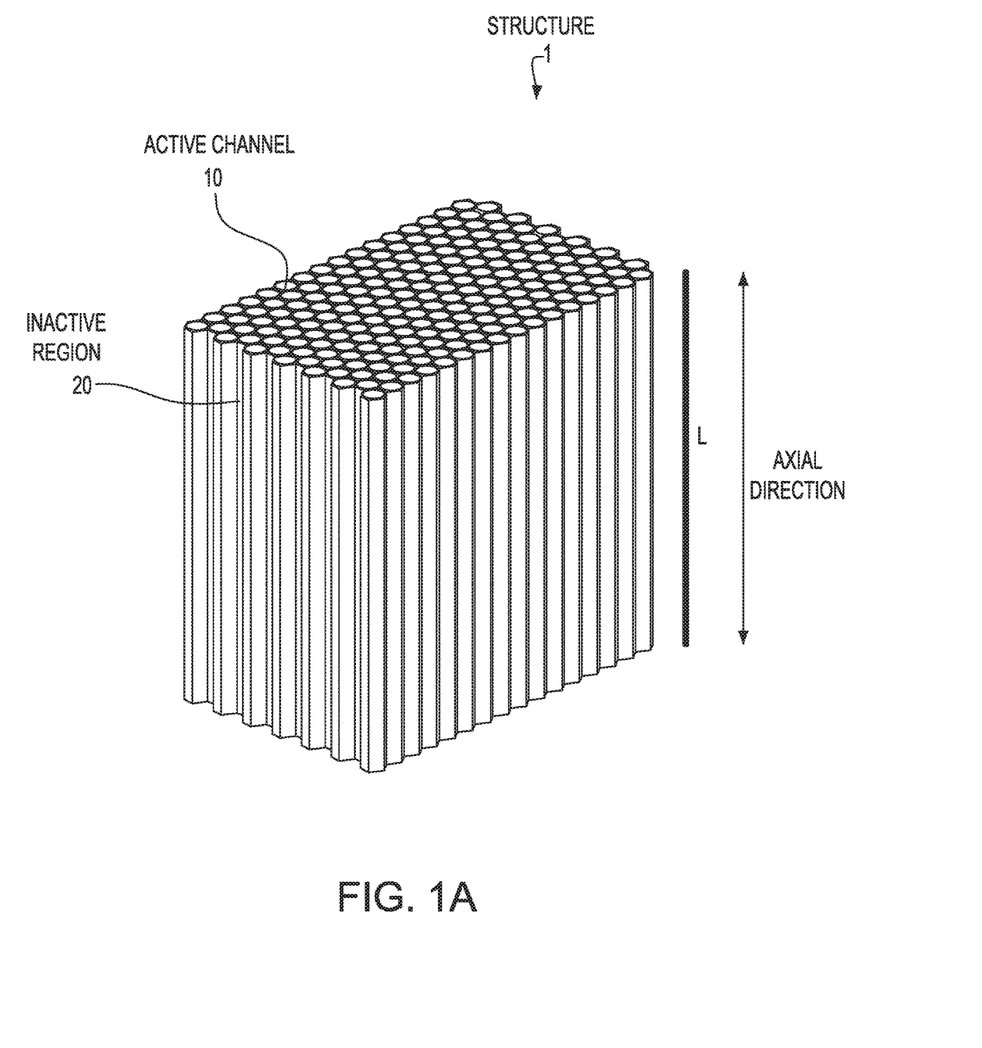
FIG. 1A illustrates a perspective view of an apparatus (without showing a seal) for use in a directional-neutron detector in accordance with aspects of the disclosure.
Figure 1B:
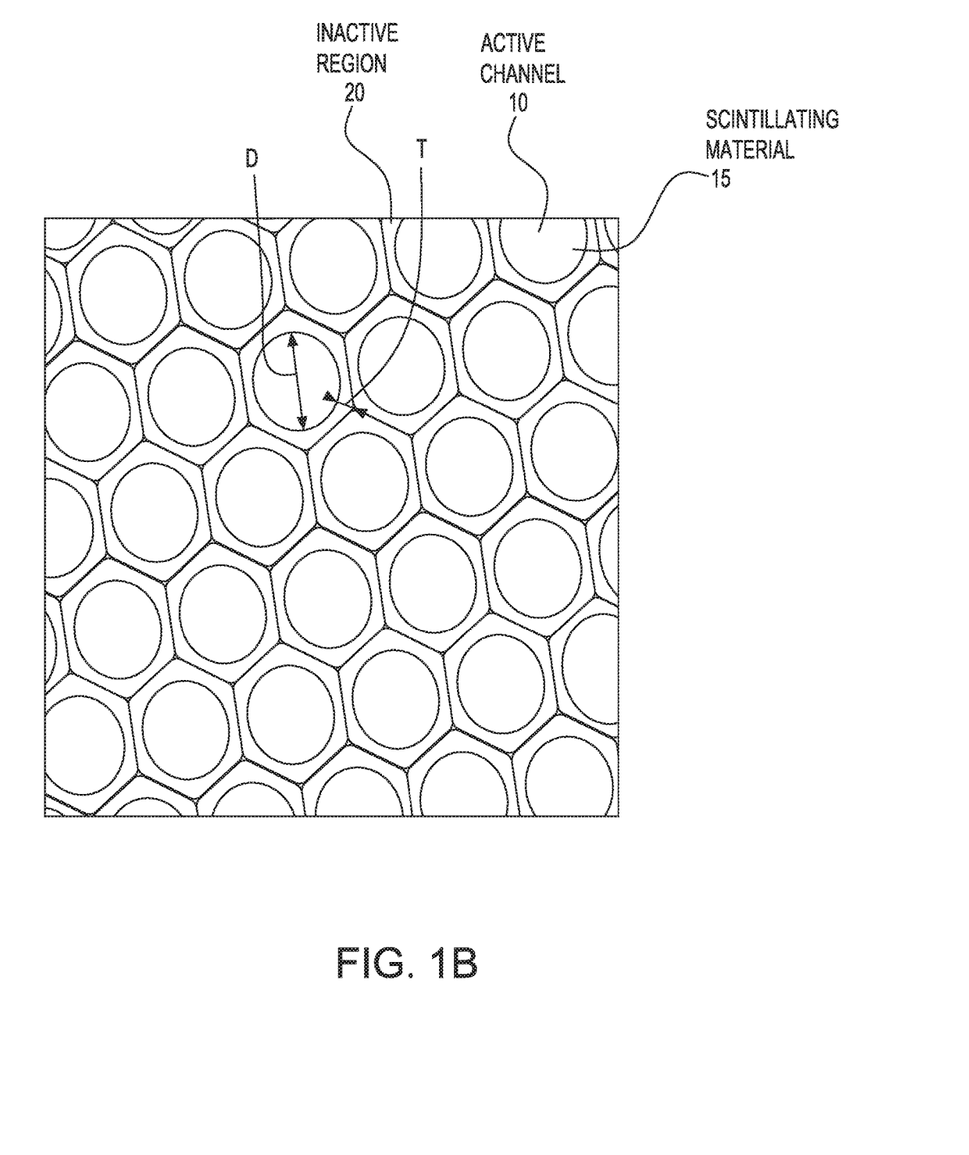
FIG. 1B illustrates an end view of the apparatus in accordance with aspects of the disclosure.
Figure 1C:
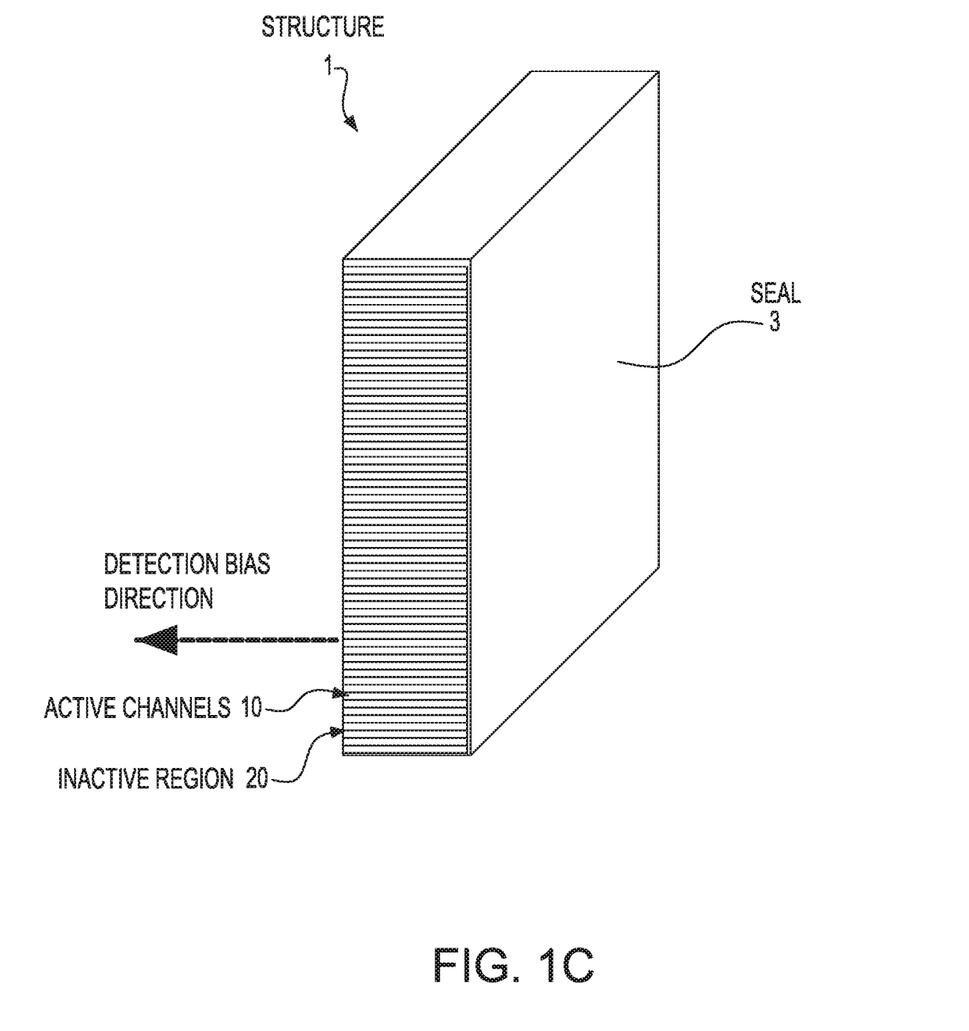
FIG. 1C illustrates a view of the apparatus in accordance with aspects of the disclosure having a seal.

FIGS. 1A-1C illustrate different views of an apparatus for use in a directional-neutron detector in accordance with aspects of the disclosure. The components in the figures are not necessarily to scale, emphasis instead being placed upon illustrating principles and aspects. As illustrated in FIG. 1, the apparatus comprises a structure 1. The structure 1 comprises multiple active channels 10 and inactive regions 20. As illustrated in FIG. 1A, the structure 1 has multiple tubes. In an aspect of the disclosure, the tubes may be fused together. The walls of the tubes form the inactive regions 20. The space or openings between walls form a vessel for scintillating material 15 (opening with the scintillating material 15 (as illustrated in the end view of FIG. 1B) will be referred to herein as the active channel 10).

In the orientation illustrated in FIG. 1A, the axial direction of the tubes is in the up-down direction. The use of the terms top, bottom, sides, up, down, laterally, left, right and similar herein, are used for convenience of description only, rather than intended to convey direction and the orientation of the structure 1 in operation or usage. The structure 1 may be used in any preferred or convenient orientation.

While tubes, e.g., cylinder, are shown in FIG. 1A, the shapes forming the active channels 10/inactive regions 20, may have other shapes, such as rectangular, hexagonal, or triangular prisms, or the like.

FIG. 1B illustrates an end view of the apparatus. This "end" is referred to herein as an end in the axial direction. As depicted, the active channel 10 has a cross-sectional shape of a circle and the inactive regions 20 (walls) has a cross-sectional shape of a hexagon. However, as noted above, other shapes may be used. FIG. 1B shows the scintillating material 15 in the circular openings.

In an aspect of the disclosure, the inactive regions 20 may be formed from any buffer material that does not contribute to a signal from the active channel. For example, any glass or glass-like substance which is solid may be used. In another aspect of the disclosure, the material may be robust against damage by organic solvents.

In an aspect of the disclosure, the scintillating material 15 emits light in response to neutron scattering. In scintillating material 15 may be any scintillating material that is hydrogenous. The scintillating material 15 may have any form, such as liquid, solid or crystal. In an aspect of the disclosure, the scintillating material 15 has neutron-gamma discriminating properties. Thus, the light pulse emitted from the scintillating material from an incident gamma verses a neutron has a different shape.

For example, the scintillating material 15 may be capable of emitting different light pulses, in response to a gamma verses and neutron event, thus would allow for gamma/neutron discrimination.

In an aspect of the disclosure, a glass capillary plate may be used as the structure 1. A glass capillary plate may comprise thousands of capillary tubes fused together into a plate. In an aspect of the disclosure, the plate may have optical-grade ground ends. The scintillating material 15 is contained in the tubes. In an aspect of the disclosure, the tubes are completely filled with the scintillating material 15 in a solvent. The solvent may be, but is not limited to, xylene or toluene. The scintillating material 15 used in the structure 1 may be tailored for a specific light collection device (described later). For example, a spectrometer may be used to characterize the light emitted by different scintillating mixtures to properly match them to the light collection device and coupling. A light collection device has wavelengths or ranges of wavelengths which it is sensitive to, e.g., maximally efficient. The wavelength(s) are specific to the nature of the device chosen, and are provided by the device manufacturer as part of the device's specifications. Accordingly, the light output from the scintillating material should match the wavelength sensitivity of the selected light collection device. Additionally, the optical coupling, including any seal and optical grease or cement may be configured to readily transmit certain wavelengths or ranges of wavelengths. The light output from the scintillating material should match the wavelength(s) transmission of the grease or cement (and seal).

For example, the scintillating material 15 may be tailored by selecting/adjusting the fluors and/or wavelength shifters (included in the scintillating material 15) such that the peak emission wavelength(s) of the scintillating material 15 overlaps with the peak sensitivity wavelength(s) of the light collection device (as well as the transmission wavelengths of the grease or cement and seal).

In FIGS. 1A and 1B, a seal is not depicted to allow for the ends to be viewed. FIG. 1C illustrates a view of the structure 1 having a seal 3. Although not viewable in FIG. 1C, the seal 3 is also disposed along the other end in the axial direction of the structure. In an aspect of the disclosure, the seal may be a Teflon material configured to maintain the scintillating material 15 within the openings. The seal may or may not surround all sides of the structure 1.

When installed or used in a directional-neutron detector, as described later, the housing and/or reflective surface and/or light collection device may serve as the seal 3.

In an aspect of the disclosure, the diameter of the opening (e.g., diameter of active channel, shown in FIG. 1B as "D"), inactive regions thickness (wall thickness, shown in FIG. 1B as "T") and length in the axial direction (shown in FIG. 1A as "L") may be selected based on the expected neutron energies to enable the optimal sensitivity to neutron direction.

The energy transferred to a scintillating material 15 depends, via several steps as described below, on an incident angle of the neutron when being exposed to the scintillating material 15.

A neutron transfers energy to the hydrogenous component (protons or deuterons) of the scintillating material 15 through elastic scattering:

$$\frac{E_r}{E_n} = \frac{4M_r M_n}{(M_r + M_n)^2} \cos^2(\theta), \quad (1)$$

where $E_r$ is the recoiling (proton, deuteron) energy, $E_n$ is the incident neutron energy, $M_r$ is the recoiling (proton, deuteron) mass, $M_n$ is the neutron mass, and $\theta$ is the angle between the neutron and recoil (proton, deuteron).

$\theta$ can vary between 0 and 90 degrees, and the energy of the recoiling (proton, deuteron) varies correspondingly. As can be seen from equation 1, a maximum energy donated at a scattering angle of 0 degrees (cosine squared=1).

Accordingly, when the incident neutron enters parallel to the axial direction of the active channel 10, the maximum recoil energy direction is also aligned with an active channel, and the maximum energy from the recoil (forward-angle scattering) is deposited in the scintillation material 15.

In contrast, when the incident neutron enters perpendicular to the axial direction of the active channel 10, the maximum-energy recoil direction (forward-angle scattering) is also perpendicular to the axial direction of the active channel 10, causing the recoil to pass through a smaller distance of scintillating material 15 and deposit a large portion of its energy in the adjacent inactive region 20.

The recoiling hydrogen isotope (proton or deuteron) loses energy as it travels through both the active channel 10 (with the scintillating material 15) and inactive regions 20. The rate of energy loss is dependent upon the specific material, and described by the Bethe-Bloch formula:

$$-\frac{dE}{dx} = \frac{4\pi e^4 z^2}{m_0 v^2} NZ \left[ \ln \frac{2m_0 v^2}{I} - \ln\left(1 - \frac{v^2}{c^2}\right) - \frac{v^2}{c^2} \right], \quad (2)$$

where dE/dx is the stopping power (energy loss as a function of position along particle track), v and z are the velocity and charge of the incident particle, N and Z are the number density and atomic number of the absorber atoms in the stopping material (e.g., scintillating material 15 or material forming the inactive region), $m_0$ is the electron rest mass, e is the electron charge, and c is the speed of light.

The velocity v of the incident particle, e.g., the recoiling (proton, deuteron) from the scintillating material 15, is related to its energy by:

$$E = mv^2/2. \quad (3)$$

The maximum recoil velocity corresponds to the maximum recoil energy. If the recoiling (proton, deuteron) from the scintillating material 15 travels along the axial direction of the active channel 10, it will experience the largest integrated energy loss within the active region, losing all or nearly all of its incident energy in the scintillating material 15. Thus, a maximum amount of light will be emitted by the scintillating material 15.

Energy deposited along the tracks of recoiling hydrogen isotopes in the scintillating material 15 is converted into light as described by the Birks formula:

$$\frac{dL}{dx} = \frac{S_{\mathit{eff}} \frac{dE}{dx}}{1 + kB\frac{dE}{dx} + C\left(\frac{dE}{dx}\right)^2}, \quad (4)$$

where dL/dx is the light response as a function of position along the particle track, dE/dx is the stopping power (energy loss as a function of position along particle track), $S_{\mathit{eff}}$ is the normal scintillation efficiency, kB is the quenching probability, and C is an empirical parameter derived from fits to data.

This formula can be parameterized as:

$$L(E_x) = aE_x + b(1 - e^{cE_x}) \quad (5)$$

where $E_x$ is the initial energy of the ionizing particle (e.g., the recoiling hydrogen isotope), and a and b are empirically-derived constants related to the scintillating material 15.

Thus, when the maximum recoil energy is lost in the scintillating material 15, the maximum light emitted is created.

In an aspect of the disclosure, by having the active channels 10 separated by the inactive regions 20, directionality for the detection is created. Additionally, in an aspect of the disclosure, setting "D", "T" and "L" further enhances the directionality. Higher incident neutron energies create higher energy hydrogen recoils and therefore require the material forming the inactive region to be thicker and/or denser between the active channels 10 in order to suppress the perpendicular signal. For example, the density of the inactive region is selected to inhibit recoil energy from being transferred from one active channel to another. In other words, the density and/or dimensions of the inactive regions may be selected to cause the highest-energy recoils from neutrons incident perpendicular to the channel axis to stop inside the inactive region.

Therefore, arrangements are possible in order to "tailor" the response to the type of neutron source anticipated (for example, the 2-3 MeV neutrons from fissionable material, or the ~6 MeV neutrons from californium).

In another aspect of the disclosure, "D", "T" and "L" may be set to increase the light emitted.

Figure 2:
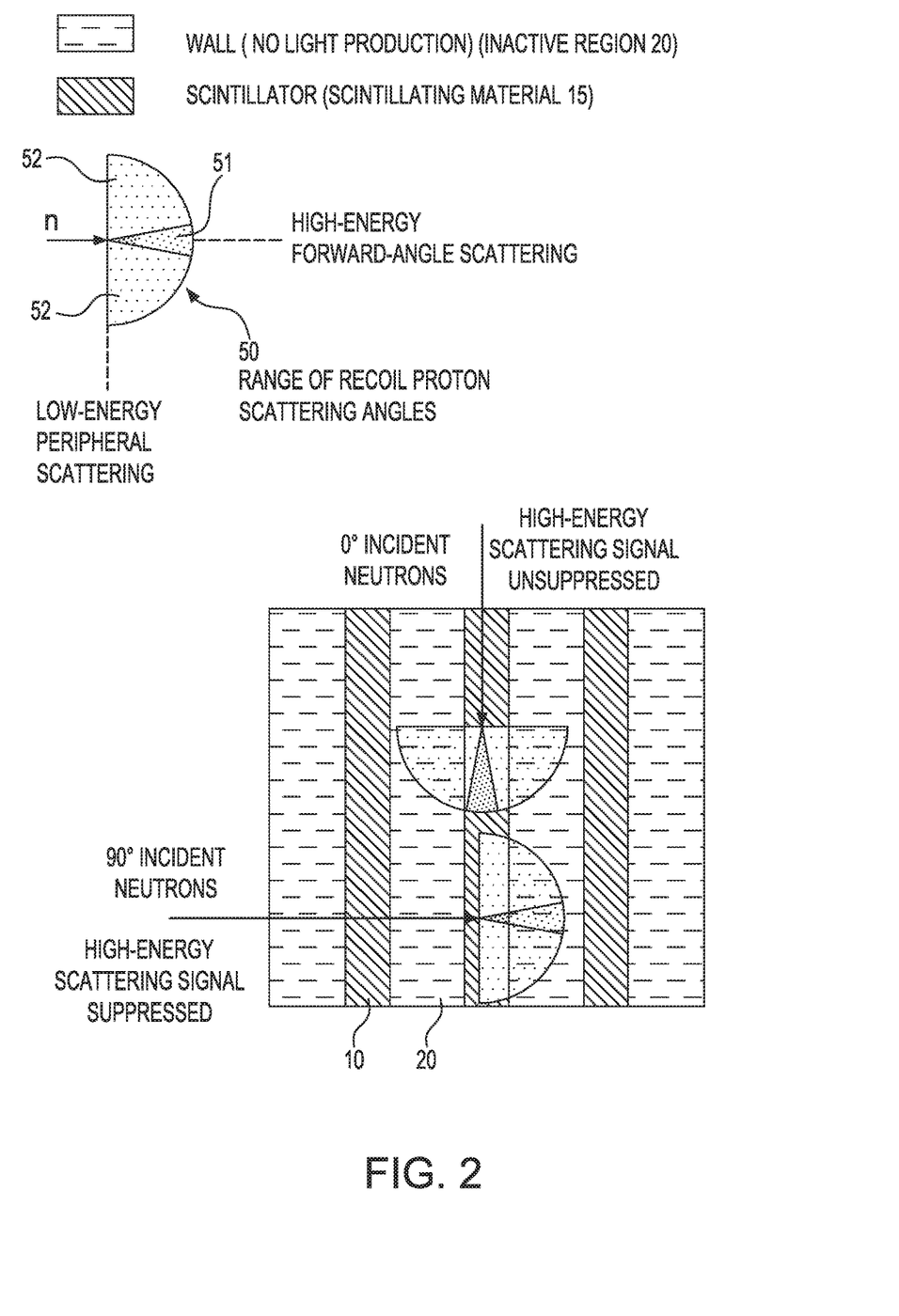
FIG. 2 illustrates a representative sectional view of the apparatus in accordance with aspects of the disclosure showing scattering at 0° incident angle and 90° incident angle.

FIG. 2 is a sectional illustration of the active channels 10 and inactive regions 20 and shows the angle dependency of the scattering. The lines of arrows represent the direction of the incident neutron, with the end of the arrow representing initial scattering. The range of recoil proton scattering angles 50 is depicted as a half-circle. In the half-circle, the higher energy forward angle scattering is depicted in a darker shading as a cone 51, e.g., center of the half-circle. Lowerenergy peripheral scattering 52 is shown in the lighter shading, respectively on the outside of the cone. Thus, as can be seen from the sectional illustration, more of the higher energy forward scattering, e.g., cone 51, is within the active channel 10 (in contact with the scintillating material 15) when the incident angle is 0°. In contrast, a smaller amount of the higher energy forward scattering, e.g., cone 51, is within the active channel 10 (in contact with the scintillating material 15) when the incident angle is 90°.

Figure 3:
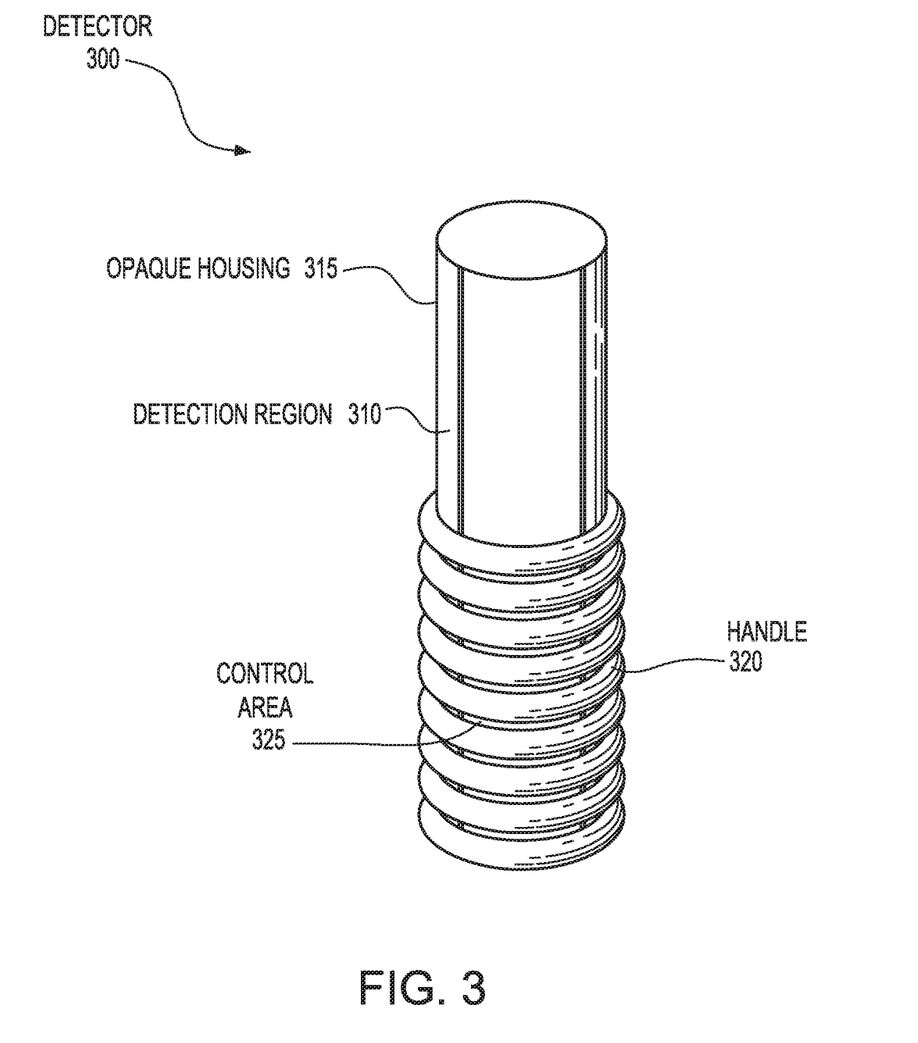
FIG. 3 illustrates a directional-neutron detector in accordance with aspects of the disclosure.
Figure 4:
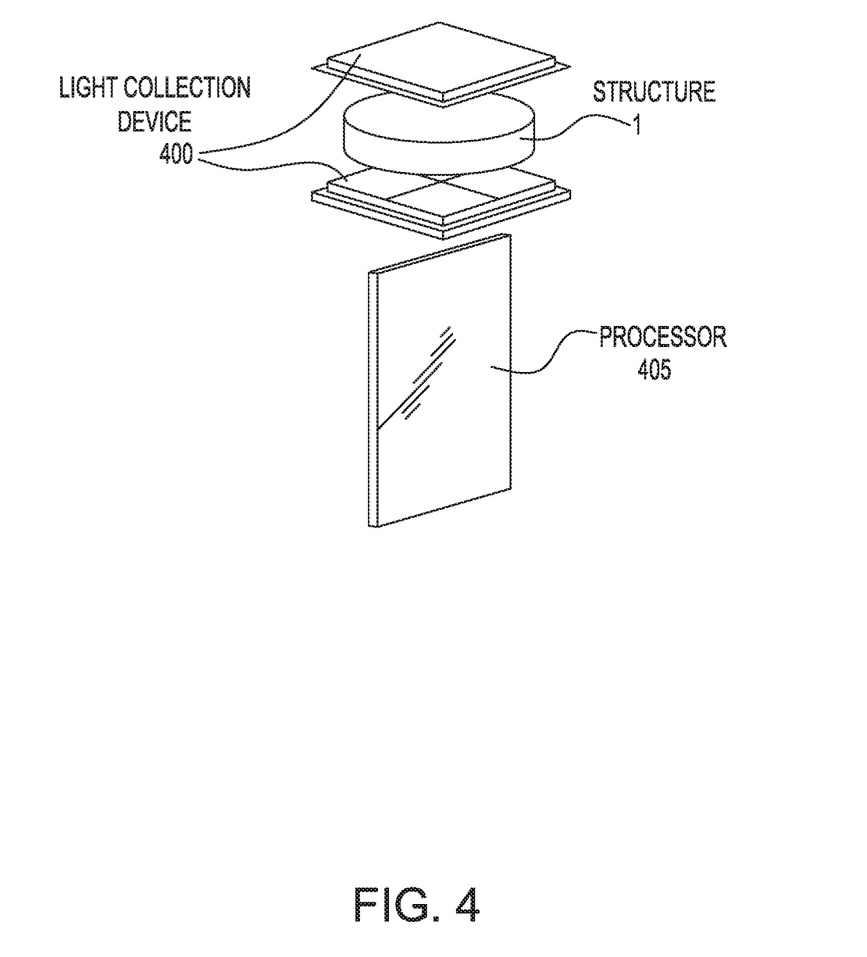
FIG. 4 illustrates an exploded view of certain features of the directional-neutron detector in accordance with aspects of the disclosure.

FIG. 3 illustrates a directional-neutron detector 300 in accordance with aspects of the disclosure. FIG. 4 illustrates an exploded view of certain features of the directional-neutron detector 300 in accordance with aspects of the disclosure. As illustrated in FIG. 3, the detector 300 comprises a detection region 310 having an opaque housing 315, a handle 320 and a control area 325.

The structure 1 is disposed within the detection region 310. A light collection device 400 is coupled to at least one end (in the axial direction) of the structure 1. While FIG. 4 illustrates two light collection devices 400, one on each end, the light collection device 400 may be only coupled to one of the ends.

For clarity of the description, the disclosure will refer to "the light collection device 400" instead of "each of the at least one light collection device 400" or "each light collection device 400".

As shown in FIG. 4, the collection face of the light collection device 400 is disposed perpendicular to the axial direction of the active channels 10 which enables the light collection device 400 to receive light emitted from each active channel. The light collection device 400 is optically coupled to the structure 1. In an aspect of the disclosure, the light collection device 400 is coupled to the structure 1 using either optical grease or optical cement (not shown).

In an aspect of the disclosure, the light collection device 400 may be a photomultiplier such as a photomultiplier tube (PMT). In another aspect of the disclosure, the light collection device 400 may be a silicon photomultiplier (SiPM). The photomultiplier may be a single device or multiple photomultipliers connected as an array.

In another aspect of the disclosure, the light collection device 400 may be a photodiode or any other detection/collection device sensitive to light emitted by a scintillating material. In another aspect of the disclosure, the light collection device 400 may be sensitive to a shape of the emitted light pulse.

The light collection device 400 produces a signal (or signals) proportionate to the light emitted by the scintillating material 15, e.g., converts. The signal(s) has a magnitude and duration, e.g., pulse shape. The signal may be in a form of a measurable voltage or a current depending on the type of device used as the light collection device 400.

In another aspect of the disclosure, a reflector may be coupled to one end of the structure (in the axial direction). For example, when a light collection device 400 is coupled to only one end of the structure 1 (in the axial direction), a reflector may be coupled to the other end. The reflector may act as a seal to maintain the scintillating material 15 within the structure 1 (in the openings). For example, a mirror-finished aluminum plate may be used as the reflector.

The detector 300 comprises a processor 405 electrically coupled to the light collection device 400. For example, the processor 405 may be coupled to the light collection device 300 via a conduit. The conduit may be a flexible circuit board, a wire or a connection cable. The processor 405 is also coupled to a power supply (not shown). In an aspect of the disclosure, the processor 405 may supply power from the power supply to the light collection device 400, as needed. The power may be supplied to the light collection device 400 via a dedicated connection for power between the processor 405 and the light collection device 400.

In another aspect of the disclosure, the power may be supplied to the light collection device 400 without going through the processor 405.

The processor 405 is configured to determined whether light emitted by the scintillating material 15 and received or collected by the light collection device 400 was a result or responsive to radiation and count the same, e.g., count. The determination may be based on the magnitude such as a peak voltage.

The term "processor" used herein refers to any component or group of components that individually or collectively make the determination. For example, the processor 405 may be a CPU, GPU, ASIC, analog circuit, or other functional logic, such as a FPGA, PAL or PLA. In the case of a CPU or GPU, the CPU or GPU may be executing instructions that are programmed in a computer readable storage device, such as a memory.

The memory may be, but not limited to, RAM, ROM and persistent storage. The memory is any piece of hardware that is capable of storing information, such as, for example without limitation, data, programs, instructions, program code, and/or other suitable information, either on a temporary basis and/or a permanent basis.

In an aspect of the disclosure, the processor 405 uses one or more thresholds for comparison with the received signal. The one or more threshold may be stored in advance in memory. In an aspect of the disclosure, circuitry may be biased to implement a desired threshold. In an aspect of the disclosure, a high speed comparator may be used and the threshold(s) set for one of the input terminals. The count, used herein, refers to a number of times, the signal exceeds a threshold, in a preset detection period, e.g., pulses.

The processor 405 may be also configured to discriminate between light emitted in response to gamma verses a neutron (or even a beta particle) (also referred to herein as pulse shaped discrimination). This discrimination may examine the length or timing of the change in addition to magnitude. In other words, the duration of the signal exceeding the threshold is examined per pulse. For example, a tail of the pulse may be examined. The tail being the portion of the pulse after the peak. A shorter duration indicates gamma radiation whereas a longer duration indicates neutrons. This difference in duration allows for discrimination between the two types of radiation.

In an aspect of the disclosure, a time threshold for gamma rejection may also be preset in the memory. Time may be measured by an internal clock.

In an aspect of the disclosure, a magnitude threshold may be set depending on the circumstances. For example, the magnitude threshold may be set based on an expected range of energies for the target, e.g., type of source/material being searched. Thus, the detector 300 may be customized for a specify target or targets.

In an aspect of the disclosure, the power supply may be an internal power source such as a battery. In another aspect of the disclosure, the power supply may be external, such as an electric outlet. In this case, the detector 300 may include a power cable with either an external or internal AC/DC converter, if necessary.

In an aspect of the disclosure, the handle 320 is disposed around a portion of the opaque housing 315. In FIG. 3, the entire housing is opaque. However, the entire housing does not need to be opaque. In other aspects of the disclosure, just the portion of the housing surrounding the structure 1 and light collection device 400 is opaque and the remaining portion is not. The handle 320 may be formed of a non-slip material. As depicted, the handle 320 circumvents the circumference of the detector 300. However, in other aspects of the disclosure, the handle 320 may only be disposed over a portion of the circumference. The handle 320 depicted in FIG. 3 is just an example and the handle may have different shapes and sizes in accordance with aspects of the disclosure.

The detector 300 may also comprise an On/Off switch or button (not shown in FIG. 3).

The detector 300 may also comprise a wireless transmitter configured to transmit the results of the determination by the processor 405 to an external notification device, such as a display to display the same. For example, when the detector 300 is used as part of a system in an airport or border patrol, the detector 300 may wirelessly transmit the count (or other detection result) to a monitor screen (an example of a display) viewable by a security officer or agent.

Figure 5A:
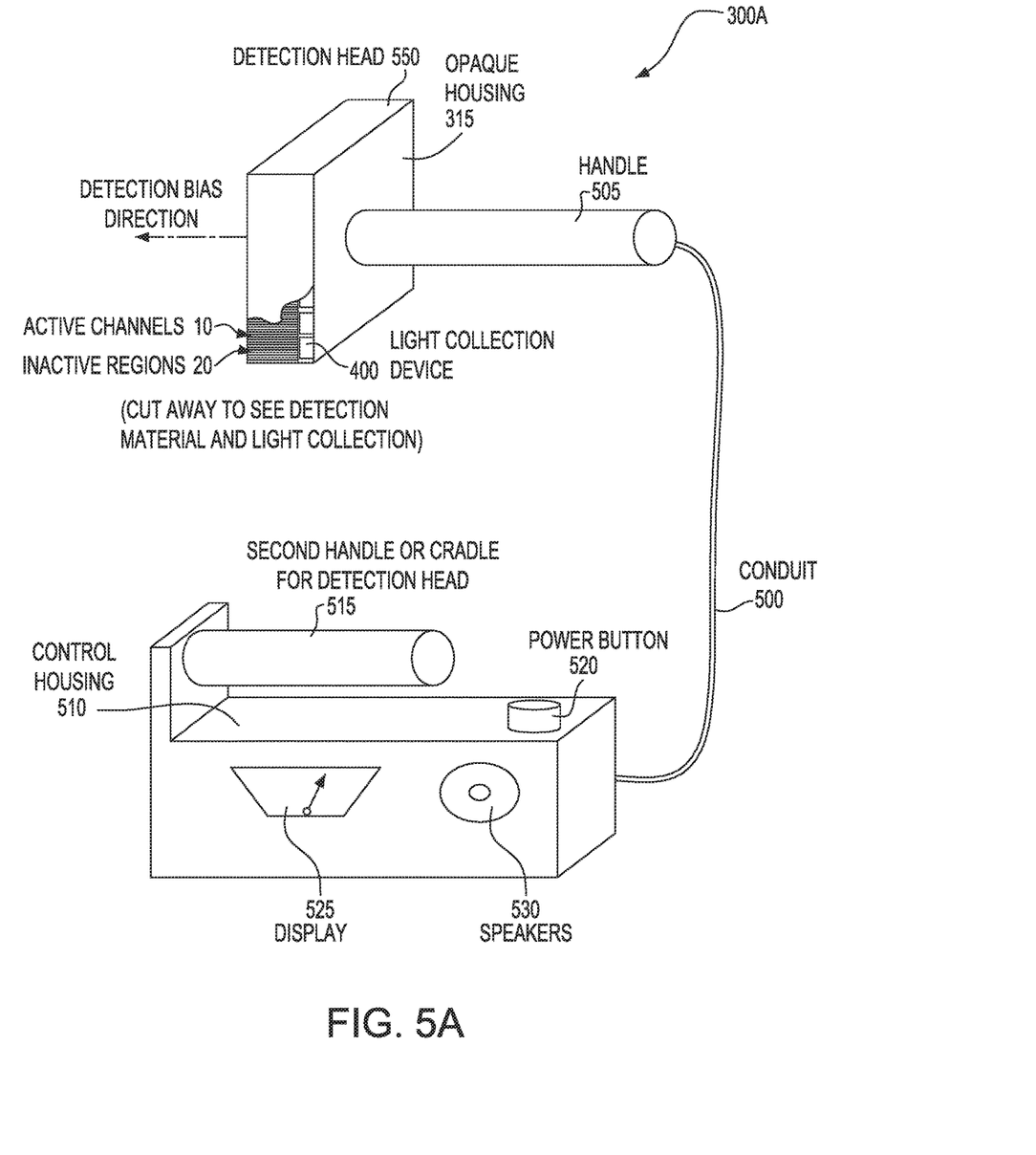
FIG. 5A illustrates another directional-neutron detector in accordance with aspects of the disclosure.

As illustrated in FIG. 3, the processor 405 is located within the control area 325. In an aspect of the disclosure, as illustrated in FIG. 3, the control area 325 and detection region 310 are within the same housing, e.g., opaque housing 315. However, in other aspects of the disclosure, the detection region 310 and the control area 325 may be provided in separate housings. For example, FIG. 5A illustrates another detector 300A in accordance with aspects of the disclosure. The detector 300A includes a detection head 550 and a control housing 510. The detection head 559 is separate from the control housing 510. The detection head 500 has a similar opaque housing 315 around the structure 1 (active channels 10/inactive regions 20) and the light collection device 400. A cutaway was included in FIG. 5A to show the active channels 10 and inactive regions 20 and the light collection device 400. The detector 300A also includes a separate control housing 510. The processor (not shown in FIG. 5A), a power button 520, display 525 and speaker 530 and power supply is on or within the control housing 510. In other aspects of the disclosure, one of the display 525 or speaker 530 may be omitted.

In another aspect of the disclosure, the detector 300/300A may comprise a vibration device, e.g., vibrator, installed in one or more of the handles as a notification device. The vibration device is coupled to the processor. The processor is configured to cause the vibration device to vibrate when the count exceeds the preset threshold.

A handle 505 is coupled to the light collection device 400. A control handle 515 may be coupled to the control housing 510. In another aspect of the disclosure, the control housing 510 may include a cradle for the detection head 550.

Similar to the detector 300 (depicted in FIG. 3), the processor, e.g., 405, is electrically coupled to the light collection device 400 via a conduit, e.g., conduit 500. As illustrated in FIG. 5A, the conduit 500 extends through the handle 505. For example, the handle 505 may have an opening on an end. The conduit 500 is configured to fit within the opening.

The processor is coupled to the display 525 and/or speaker 530. The display 525 and/or speaker 530 are notification devices. The processor causes the result of the determination and count to be displayed on the display 525. For example, the display 525 may be a dial display having numbers indicating the neutron level, e.g., count or count rate. In another aspect of the disclosure, the processor may be further configured to issue an audible notification via the speaker 530 when the count exceeds one or more set threshold(s). The set threshold(s) may be stored in memory. Where the processor includes comparators or other analog circuit elements or logic, the threshold(s) may be set through appropriate biasing of the circuit elements, setting the threshold(s) to a terminal of the comparators or the like.

Figure 5B:
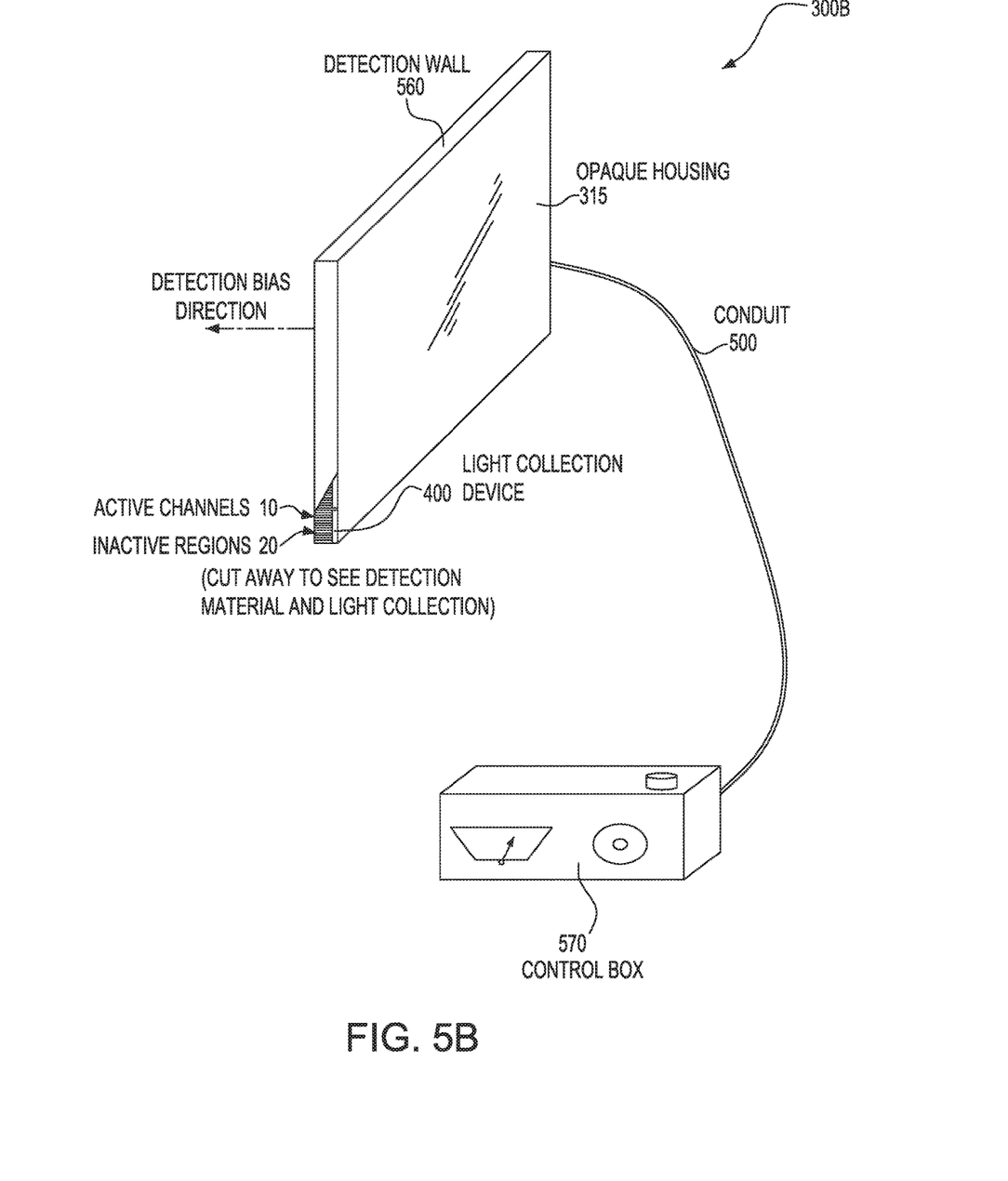
FIG. 5B illustrates another directional-neutron detector for wall-mount detection in accordance with aspects of the disclosure.

Although both FIGS. 3 and 5A illustrate detectors 300/300A with handles, the structure 1 disclosed herein may be incorporated into other detectors which are not handheld. For example, in other aspects of the disclosure, one or more structures (with their corresponding light collection device (s)) may be incorporated in wall mounted neutron detectors (detection system 300B) as shown in FIG. 5B. One or more structures (with their corresponding light collection device (s)) are integrated into a detection wall 560. The one or more structures 1 and the light collection device(s) 400 are enclosed in the opaque housing 315. FIG. 5B also shows a cutaway in the opaque housing 315 to show the active channels 10 and inactive regions 20 of the structure 1 (and the light collection device 400). The detection wall 560 is coupled to a control box 570 via a conduit 500. The control box 570 includes similar components as described above with respect to FIG. 5A. For example, the control box 570 may include a processor, display and/or speaker (as a notification device) and a power supply. The conduit (e.g., 500) is also similar to the conduct described above. The mounting and wall is not shown in FIG. 5B. The detection wall 560 is mounted to a wall such that the face of the wall is perpendicular to the detection bias direction. The detection wall 560 may be mounted using mounting flanges.

Additionally, the directional-neutron detectors may be incorporated in portal monitoring devices at airports, ports, borders, and shipping containers.

In other aspects of the disclosure, the directional-neutron detectors may be used at nuclear reactors and other radioactive material sites.

In other aspects of the disclosure, the directional-neutron detectors may be used at nuclear facilities such as research laboratories, universities, hospitals and medical centers.

Simulation Results

Figure 6:
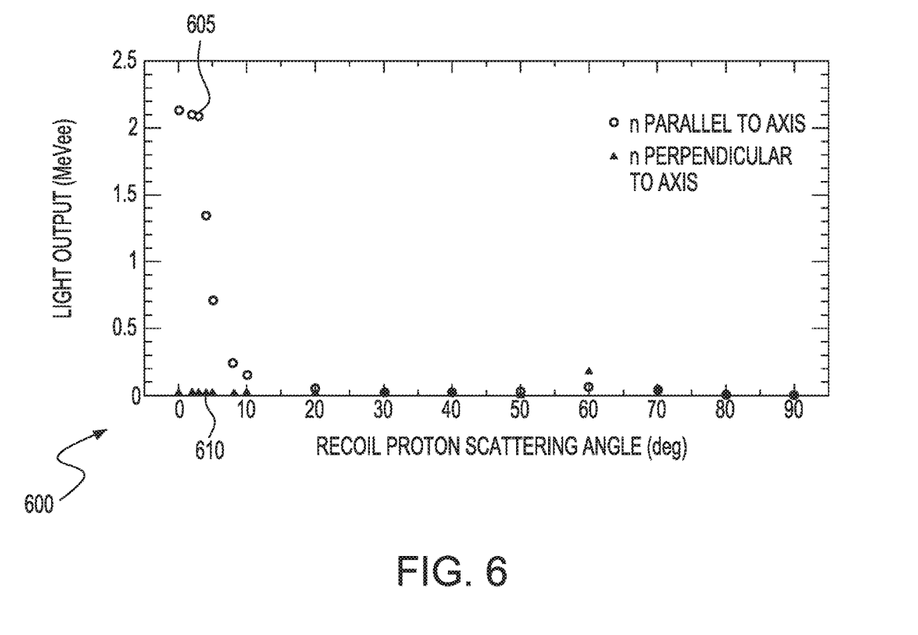
FIG. 6 illustrates a graph showing simulation results of two different incident neutron directions on a detector in accordance with aspects of the disclosure.
Figure 7:
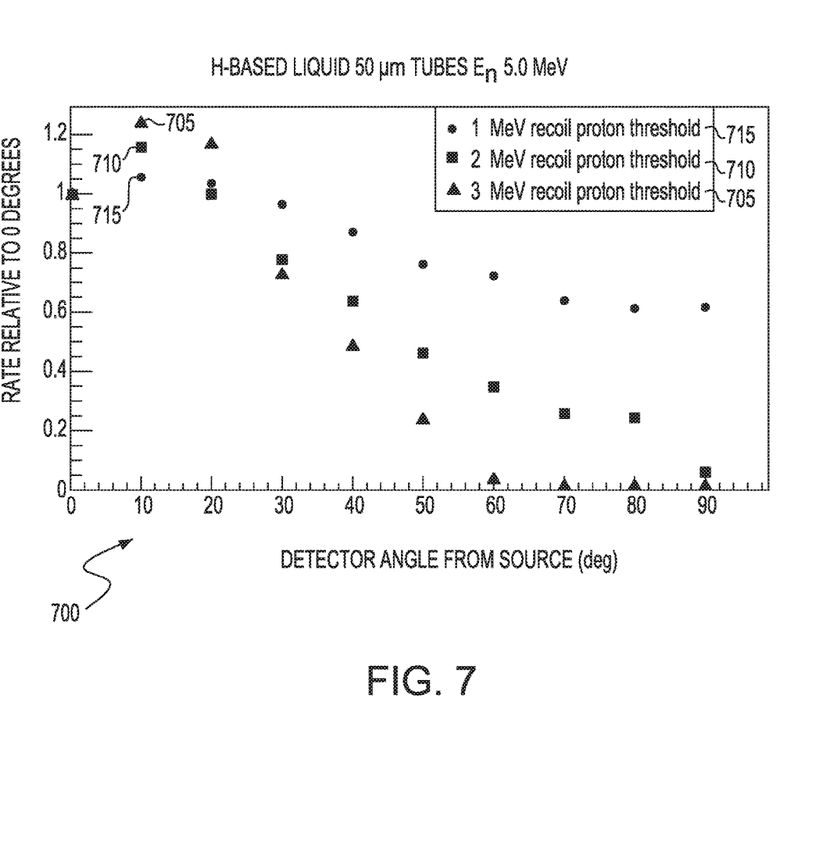
FIG. 7 illustrates a graph showing simulation results for three different thresholds, the simulation in accordance with aspects of the disclosure.

Detection results from a simulated detector having a structure designed in accordance with aspects of the disclosure are shown in FIGS. 6 and 7. A 25 mm diameter by 9 mm thick glass capillary plate with 50 micron diameter tubes was used for the simulation. The glass capillary plate was filled with a liquid scintillating material. A PSD threshold of 0.1 MeVee (mega electron-volt electron equivalent) was used. The PSD threshold refers to a minimum light output by the scintillating material in which gamma event can be distinguished between a neutron event. It is a parameter of varying amplitude created through a comparison of ratios of the light pulse integrated over a short time and a long time (thus it takes into account both magnitude and time).

FIG. 6 shows a graph 600 of simulations of the anticipated detector performance for two different sources of 5 MeV (Mega Electron Volts) incident neutrons, one parallel to the axial direction, and one perpendicular. The incident neutron strikes a proton inside the detector liquid, which can scatter over a range of angles. Recoiling protons from an incident 5 MeV neutron produce different light emitted based on how much energy they deposit inside a capillary tube. For neutrons impingent parallel to the capillaries, far more energy is deposited than for neutrons impingent perpendicular. These perpendicular neutrons create almost no light emitted. The circular points represent values for parallel to the axial direction 605 (accounting for the range of recoil proton scattering angles as described above in FIG. 2) and triangle points represent values for perpendicular impingent

610 (accounting for the range of recoil proton scattering angles as described above in FIG. 2). The light output is for the point of interaction of the neutron and recoiling proton.

As can be seen from the circular points 605, the detector is most sensitive within 10° about the axial direction (which is also shown in FIG. 2 "51" as the dark cone in the center of the half-circle) with a PSD of around 0.1 MeVee. Also as can be seen, the detector has almost no sensitivity where the neutron impinges perpendicular to the axial direction, e.g., triangular points are below 0.1 MeVee for most of the range of recoil proton scattering angles).

Thus, the simulation indicates the directionality of a detector using a structure in accordance with aspects of the disclosure.

FIG. 7 illustrates a graph 700 of the simulated detector count rate as a function of angle for 5 MeV incident neutrons for different detection threshold: 1.0 MeV (715), 20 MeV (710) and 3 MeV (705). The collected light (MeVee) was converted into energies (MeV). The simulation results accounted for all potential proton scattering angles resulting from the incident neutron. The count rates are shown relative to 0 degrees (normalized to align with the source). This is the rate as determined by the light output at the point of interaction, As can be seen from the simulation results, raising the threshold based on the circumstances and known type of source/material being searched may improve the directionality of a detector (even further). For example, when the threshold was 3.0 MeV (shown as 705), the normalized rate where the detector angle from the source is less than 20°, is maximized at ~1, whereas greater than 20°, the rate dramatically decreases. At 40°, the rate is less than 0.5. In contrast, when the threshold was 1.0 MeV (shown as 715), the normalized rate changes less dramatically as the detector angle increases from the source. At 40°, the rate is still above 0.8.

However, for all three thresholds, when the angle of the simulated detector was greater than ~20° from the source, the rate decreased.

Testing

A prototype detector was made having a structure in accordance with aspects of the disclosure. The structure was a 1" diameter capillary plates from Collimated Holes, Inc., comprised of arrays of 50 micron diameter capillary tubes with thin (~70 micron center-to-center) leaded glass walls. The capillary plate was soaked in p-xylene, dried under vacuum, and then encapsulated in a 1" diameter, thin-walled teflon cup and filled with a p-xylene based organic liquid scintillator. The capillary plate was first soaked to clean it of any remaining debris or solvents/chemicals used in the production process.

An off-the-shelf, 1.5" diameter photomultiplier tube (PMT) was pressed against the open back of the teflon container to act as the liquid seal and optical coupling (as the light collection device), and the entire assembly wrapped in black tape to be made light-tight (as the opaque housing).

Initially, as a baseline or check source, the detection target was a standard Californium-252. The detector was aligned with the detection target, e.g., axial direction of the tubes. The detector was then rotated away from alignment to pointing perpendicular. The detection target was approximately one foot away. As expected, there was a reduction in the number of counts over a set period of time as the detector was rotated away from parallel alignment. The reduction was approximately 40% without any optimization in the arrangement of the prototype, setup, or analysis.

Subsequently, the detector was exposed to a neutron flux produced by the d(d,n) reaction with a low energy, high intensity beam of deuterons. The beam was implanted in a steel vacuum flange, which allowed the production of d(d,n) neutrons at 2.2 MeV. The prototype detector was connected to a CAEN® digitizer and the output analyzed with Wave-Dump and ROOT for two angles, 0 (parallel) and 90 (perpendicular) with respect to the neutron source, at about 2' distance. WaveDump is a console application supporting digitizers and used for readout and data analysis. ROOT is a C-based open source analysis code. A threshold of 15000 (arb units) was used. The digitizer accepted all of the signals and the threshold was applied later by a processor running the above software.

Figure 8A:
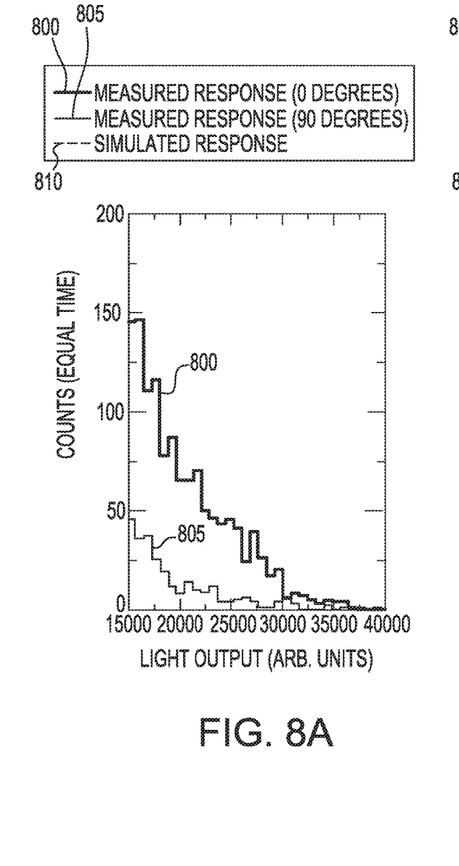
FIG. 8A and FIG. 8B illustrate experimental results for counts and rate of an apparatus for use in a directional-neutron detector in accordance with aspects of the disclosure, the apparatus comprises a 1" diameter capillary plates from Collimated Holes, Inc., comprised of arrays of 50 micron diameter capillary tubes with thin (~70 micron center-to-center) leaded glass walls. A p-xylene based organic liquid scintillator was used.
Figure 8B:
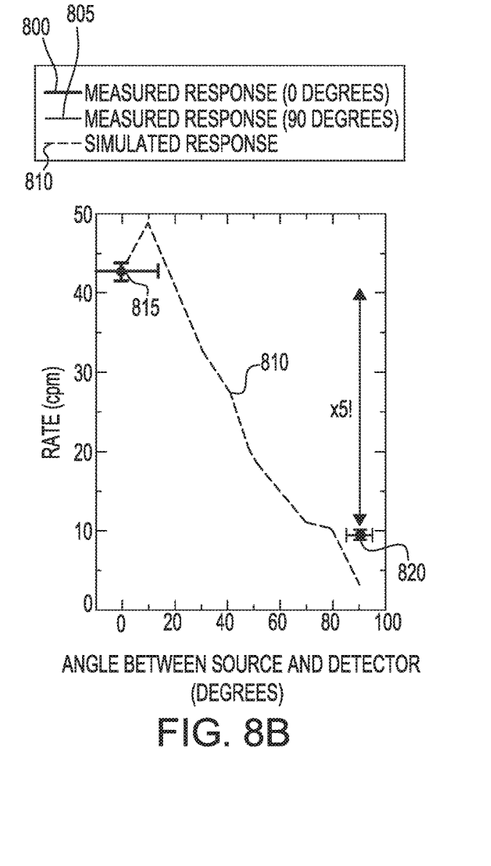

FIGS. 8A and 8B illustrate the results. FIG. 8A shows the light output verses count (measured response) (at both 0 and 90 degrees). The response curve for 0° is 800 (axial aligned) and response curve for 90° is 805 (perpendicular to the source). PSD removed the gammas. FIG. 8A is the light response of the detector over a detection time. The same detection time was used for both 0° and 90°. The counts refer to the number of pulses having the specified light output (in arb units), in other words, a histogram.

FIG. 8B shows a light response (as a detection rate) The rate is in counts per minute. This was determined as the number of events, e.g., pulses above the light output threshold, scaled for a minute. The measured points are shown as 815 (at 0°) and 820 (at 90°). FIG. 8B also shows simulated rates between 0 and 90 degrees, similarly scaled for a minute, e.g., 810. As can be seen from FIG. 8B, a factor of five reduction (shown in FIG. 8B as ×5!) in count rate was achieved between the two extremes (e.g., 0° and 90°), further demonstrating the directionality of the structure in accordance with aspects of the disclosure.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. An apparatus for use in a directional-neutron detector, the apparatus comprising:
    a structure having a plurality of parallel active channels separated by inactive regions, the plurality of active channels being filled with scintillating material, the scintillating material configured to emit light in response to neutron scattering, the scintillating material being sealed in the plurality of active channels, the seal being disposed on respective ends of the plurality of active channels,
    wherein the structure is a glass capillary plate, the glass capillary plate comprising two or more hollow tubes, wherein the scintillating material is disposed within the two or more hollow tubes.

2. The apparatus of claim 1, wherein walls of the two or more hollow tubes are the inactive regions.

3. The apparatus of claim 1, wherein the two or more hollow tubes are fused together.

4. The apparatus of claim 1, wherein the scintillating material is a hydrogenous scintillating material.

5. The apparatus of claim 4, wherein the scintillation material is a liquid or a solid and neutron-gamma discriminating.

6. The apparatus of claim 4, wherein the inactive regions are dimensioned to inhibit recoiling hydrogen isotopes from traveling from one active channel to another.

7. The apparatus of claim 1, wherein the dimensions of the inactive regions are based on a neutron energy range of a detection target.

8. A directional-neutron detector comprising:
    an opaque housing;
    a structure having a plurality of parallel active channels separated by inactive regions, the plurality of active channels being filled with scintillating material, the scintillating material configured to emit light in response to neutron scattering;
    at least one light collection device coupled to the structure and in optical communication with the structure, a collection face of the at least one light collection device being disposed perpendicular to an axial direction of the plurality of parallel active channels, the at least one light collection device configured to convert the emitted light from the scintillating material into a signal, the light collection device and the structure being contained in the opaque housing; and
    a processor coupled to the light collection device and a power supply, the processor configured to process the signal to determine whether the signal resulted from emitted light in response to neutron scattering, and issue a notification based on the determination.

9. The directional-neutron detector of claim 8, further comprising a control housing, the processor and the power supply being contained in the control housing.

10. The directional-neutron detector of claim 9, wherein the control housing and the opaque housing is separate and the at least one light collection device and the processor is coupled via signal and power conduit.

11. The directional-neutron detector of claim 10, further comprising a handle coupled to one side of one of the at least one light collection device, wherein another side of the one of the at least one light collection device is coupled to the structure.

12. The directional-neutron detector of claim 11, wherein the signal and power conduit extends through the handle.

13. The directional-neutron detector of claim 11, further comprising another handle coupled to the control housing.

14. The directional-neutron detector of claim 8, further comprising at least one notification element selected from a group consisting of a visual display, a speaker and a vibration device, the at least one notification element is electrically coupled to the processor.

15. The directional-neutron detector of claim 8, wherein the at least one light collection device is coupled to the structure by optical cement or optical grease.

16. The directional-neutron detection of claim 15, wherein the at least one light collection device comprises a first light collection device and a second light collection device, respectively disposed perpendicular to the axial direction of the plurality of parallel active channels on respective ends of the plurality of parallel active channels in the axial direction.

17. The directional-neutron detector of claim 8, wherein the at least one light collection device is selected from a group consisting of a photomultiplier and a photodiode.

18. The directional-neutron detector of claim 8, wherein the processor is configured to determine whether the signal resulted from emitted light in response to neutron scattering using pulse shape discrimination to distinguish being a signal in response to neutrons or gammas.

19. The directional-neutron detector of claim 8, wherein the processor is configured to determine whether the signal resulted from emitted light in response to neutron scattering by comparing a variable threshold with the signal.

20. The directional-neutron detector of claim 19, wherein the variable threshold is adjustable based on a neutron energy range, whereby the variable threshold is settable to a neutron energy spectrum of a detection target.

21. The directional-neutron detector of claim 8, further comprising a handle coupled to one side of one of the at least one light collection device, wherein another side of the one of the at least one light collection device is coupled to the structure, wherein the processor is mounted within the handle.

22. The directional-neutron detector of claim 8, wherein the structure and at least one light collection device is mounted to an airport security station, a toll booth, a nuclear reactor, hospital room, research labs or shipping containers.

* * * * *